(12) United States Patent
Hwang et al.

(10) Patent No.: US 7,747,500 B2
(45) Date of Patent: Jun. 29, 2010

(54) MANAGING AND EVALUATING PROCUREMENT RISK

(75) Inventors: Jerry Hwang, Sunnyvale, CA (US); Venu Nagali, Westhampton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1450 days.

(21) Appl. No.: 10/978,895

(22) Filed: Nov. 1, 2004

(65) Prior Publication Data

US 2006/0095362 A1 May 4, 2006

(51) Int. Cl.
*G06Q 40/00* (2006.01)
(52) U.S. Cl. .......................................... 705/36; 705/37
(58) Field of Classification Search .............. 705/38, 705/36, 1, 8, 400, 32, 26, 10, 27, 34, 28, 705/7; 715/772; 707/3, 1, 104, 200
See application file for complete search history.

(56) References Cited

U.S. PATENT DOCUMENTS

| | | | |
|---|---|---|---|
| 5,287,267 A | 2/1994 | Jayaraman et al. | |
| 6,006,192 A | 12/1999 | Cheng et al. | |
| 6,188,989 B1 | 2/2001 | Kennedy | |
| 2001/0011222 A1 | 8/2001 | McLauchlin et al. | |
| 2007/0106601 A1* | 5/2007 | Shepherd | 705/38 |

OTHER PUBLICATIONS

"Inventory management with demand substitution using a new simulation approach" ; Author: Yang, Hongsuk Year: 2004; Corporate Source/Institution: The University of Chicago (0330) Adviser: Linus Schrage; Source: vol. 65/03-A of Dissertation Abstracts International. p. 1030. 160 Pages.*

* cited by examiner

*Primary Examiner*—James P Trammell
*Assistant Examiner*—John H Holly

(57) ABSTRACT

Methods, systems, and computer programs that enable procurement risk to be efficiently and effectively managed and evaluated are described. In one aspect, inputs specifying one or more forward contracts in a sourcing portfolio for procuring a resource from one or more suppliers are received. Inputs specifying one or more aspects of a target sourcing strategy for procuring the resource also are received. A procurement risk evaluation report comparing the sourcing portfolio and the target sourcing strategy is presented.

48 Claims, 12 Drawing Sheets

| Sourcing Option | 80K Samsung closed 1/28/04 | | | RESET | | DELETE | |
|---|---|---|---|---|---|---|---|
| Type | Contract | Supplier Name | Samsung | | | | |
| Status | Approved | | | | | | |

| Contract term | Description | | M1 | M2 | M3 | M4 | M5 | M6 |
|---|---|---|---|---|---|---|---|---|
| Quantity type | Fixed quantity | ⋯ | | | | | | |
| Min commitment (fixed qty) | units / period | Fill Clear | 125,000 | 100,000 | 100,000 | 100,000 | 100,000 | 100,000 |
| Max available (fixed + flexible qty) | units / period | Fill Clear | 125,000 | 100,000 | 100,000 | 100,000 | 100,000 | 100,000 |
| Flexible qty | units / period | | 0 | 0 | 0 | 0 | 0 | 0 |
| Price type | % below forecast w/ cap | ⋯ | | | | | | |
| Price (fixed quantity) | % below scenario price | Fill Clear | 1.0% | 1.0% | 0.0% | 0.0% | 0.0% | 0.0% |
| Price Cap | $ / unit | Fill Clear | $110.00 | $110.00 | $110.00 | $110.00 | $110.00 | $110.00 |
| Price Floor | NA | Fill Clear | | | | | | |
| Price (flexible quantity) | % below scenario price | Fill Clear | | | | | | |
| Price Cap | $ / unit | Fill Clear | | | | | | |
| Price Floor | NA | Fill Clear | | | | | | |
| Buyer penalties (fixed qty) | no release option | ⋯ | | | | | | |

| Additional cash payments (net buyer to supplier) | | | M1 | M2 | M3 | M4 | M5 | M6 |
|---|---|---|---|---|---|---|---|---|
| Cash payment 1 | fixed payment: $ | Fill Clear | | | | | | |
| Cash payment 2 | fixed payment: $ | Fill Clear | | | | | | |

▶ Notes

MANAGING AND EVALUATING PROCUREMENT RISK

BACKGROUND

Asset managers of large manufacturing enterprises, for example, computer manufacturers, electronics manufacturers and auto manufacturers, must determine the inventory levels of components and finished products that are needed to meet target end customer service levels (i.e., the fraction of customer orders that should be received by the requested delivery dates). For such manufacturing enterprises, the delivery of a finished product to an end customer typically involves a complex network of suppliers, fabrication sites, assembly locations, distribution centers and customer locations through which components and products flow. This network may be modeled as a supply chain that includes all significant entities participating in the transformation of raw materials or basic components into the finished products that ultimately are delivered to the end customer.

Manufacturing enterprises must arrange for the delivery of component parts and other resources that are needed to produce the finished products to be delivered to end customers. In general, manufacturing enterprises may purchase component parts on the market at the market rate or they may enter into forward supply contracts in which settlement takes place in the future at a currently agreed upon price or a pre-defined price mechanism such as a price indexed to other external or internal prices. In a forward supply contract, the contract details are agreed upon at the outset, but no resources are exchanged until the settlement (delivery) date. Money is also typically not exchanged until the settlement, though the agreement may include upfront option payments or loans to the supplier. In commodity resource markets, commodity suppliers typically observe large discrepancies between forecasted demand and actual demand and, therefore, are unable to accurately schedule plant capacity and reduce inventory risk. In these situations, commodity suppliers may be willing to accept lower future prices in exchange for large future purchasing commitments because these future purchasing commitments increase the proportion of forecasted demand that will be realized, reducing inventory or capacity utilization risk. Manufacturers may benefit if the future contract cost is lower than the future market price. In addition, manufacturers may also benefit from the increased price predictability provided by future supply contracts, if fixed price or price cap agreements help protect the manufacturers' margin from possible component price increases. Finally, manufacturers may benefit from the assurance of supply provided by the contract agreements that help prevent costly shortages. When assurance of supply is important and supplier flexibility is costly, manufacturers may even structure contract terms to pay upfront option payments or higher unit prices for the rights to purchase flexible quantities above and beyond the committed quantities.

Uncertainties in demand, market price, and market availability make valuing contract options difficult, especially when a number of contract options are considered together as a sourcing portfolio. These uncertainties also may create substantial liabilities for manufacturers when entering into future supply contracts, since demand may be less than the committed quantity, or market price may decline to less than the contract price.

Production planning organizations, such as sales, marketing, and finance, often have the most knowledge of the risks and uncertainties associated with the supply chain. Thus, such organizations are best positioned to manage procurement risks and uncertainties. Hitherto, effective methodologies for communicating a procurement strategy from production planning organizations to the procurement organization tasked with implementing the procurement strategy have not been developed. As a result, production planners have not had the metrics needed for evaluating a current sourcing portfolio and, therefore, could not effectively manage procurement risks and uncertainties.

SUMMARY

The invention features methods, systems, and computer programs that enable procurement risk to be efficiently and effectively managed and evaluated.

In one aspect, the invention features a machine-implemented procurement risk management method in accordance with which inputs specifying one or more forward contracts in a sourcing portfolio for procuring a resource from one or more suppliers are received. Inputs specifying one or more aspects of a target sourcing strategy for procuring the resource also are received. A procurement risk evaluation report comparing the sourcing portfolio and the target sourcing strategy is presented.

The invention also features a machine-implemented procurement risk management system and a computer program for managing procurement risk for implementing the above-described procurement risk management method.

Other features and advantages of the invention will become apparent from the following description, including the drawings and the claims.

DESCRIPTION OF DRAWINGS

FIG. 8 is an embodiment of a graphical user interface for receiving inputs specifying a sourcing option in a sourcing portfolio for procuring a resource.

FIG. 9 is an embodiment of a graphical user interface for receiving inputs for specifying an inventory carrying policy for a resource.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Operating Environment

Figure 1:
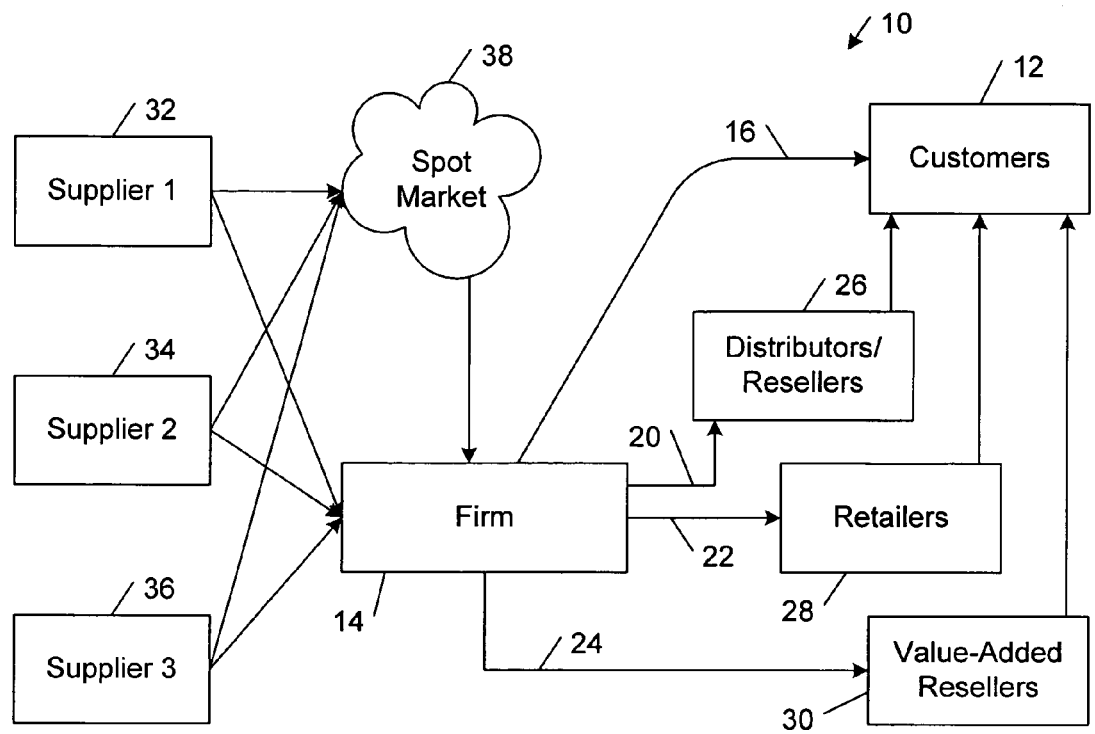
FIG. 1 is a block diagram of an exemplary supply chain that includes multiple suppliers and a firm that sells products to customers directly and indirectly through a supply channel that includes distributors (or resellers), retailers, and valued-added resellers.

Referring to FIG. 1, in one illustrative embodiment, a simplified distribution system (or supply chain) 10 includes a set of end customers 12 expressing a cumulative demand level for a particular set of goods (or products) that drives the production of those goods. The goods are produced by a firm 14 that sells products 16 to customers 12 directly and that sells products 20, 22, 24 to customers 12 indirectly through a supply channel that includes distributors (or resellers) 26, retailers 28, and valued-added resellers 30. Firm 14 may include a manufacturing line that is configured to assemble a plurality of products from component parts (or raw materials) that may be supplied directly from one or more component part suppliers 32, 34, 36 or indirectly through a spot market 38.

In operation, end customer demand drives orders, which are satisfied by shipments of products from inventories that are stored at various locations in the supply chain. Production planners for firm 14 schedule the delivery of finished goods so that the inventory levels are sufficient to cover both expected end customer demand and uncertainty in end customer demand. In general, various demand forecasting techniques may be used to project future demand by end customers 12 for finished goods.

As explained in detail below, the procurement risk management embodiments described in detail below enable production planners to efficiently and effectively communicate a target resource sourcing strategy for a response needed in the manufacture of products 20-24 to the procurement personnel charged with implementing the target sourcing strategy. In addition, these embodiments allow both production planners and procurement personnel to readily evaluate the quality of a sourcing portfolio and how well the sourcing portfolio comports with the target resource sourcing strategy. In this way, production planners are able to effectively manage and measure the risks associated with the procurement of resources that are needed to manufacture the products 20-24 sold to end customers 12.

II. System Overview

Figure 2:
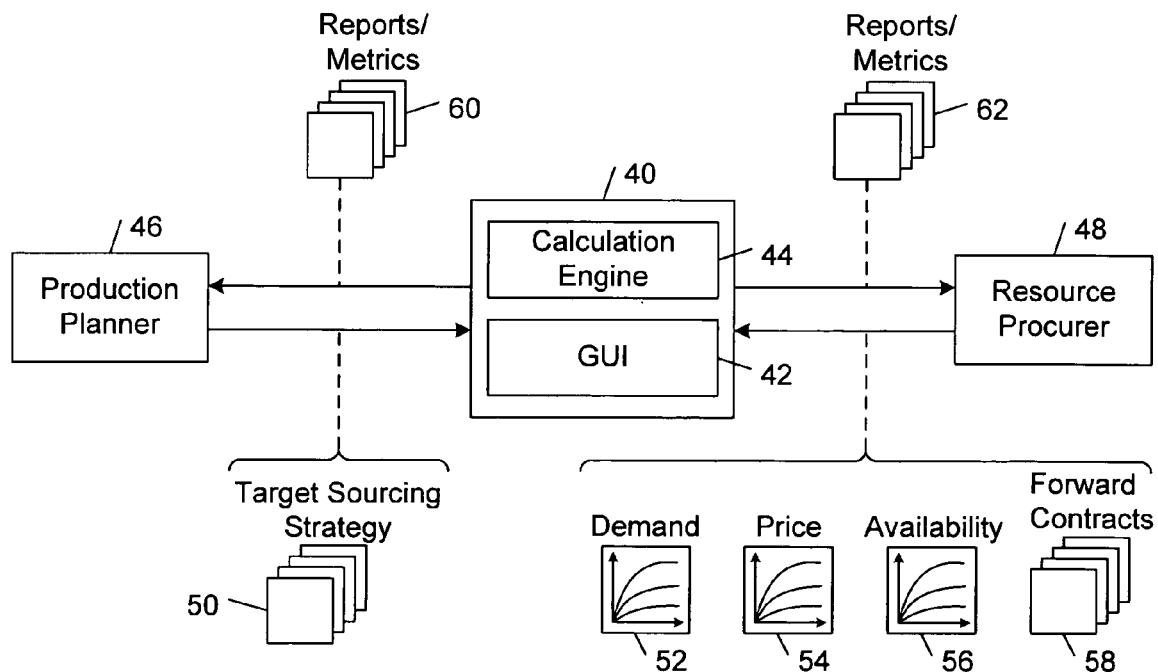
FIG. 2 is a diagrammatic view of an embodiment of a procurement risk management system.

FIG. 2 shows an embodiment of a procurement risk management system 40 that includes a graphical user interface 42 and a calculation engine 44.

The graphical user interface 42 provides a convenient and efficient way for a production planner 46 in an organization, such as sales, marketing or finance, and a resource procurer 48 to enter data into the procurement risk management system 40, to visualize a target sourcing strategy and a sourcing portfolio against multiple metrics, and to readily modify the target sourcing strategy. The graphical user interface 42 facilitates a user's interaction with the procurement risk management system 40 by providing an efficient interface through which a user may specify various procurement inputs and a clean and uncluttered interface for displaying reports/metrics 60, 62 for evaluating a procurement strategy along multiple output metric dimensions and assessing how well the procurement strategy is implemented by a sourcing portfolio. Among the types of data the procurement risk management system 40 typically receives from the production planner 46 are inputs 50 specifying a target sourcing strategy. Among the types of data the procurement risk management system 40 typically receives from the resource procurer 48 are inputs specifying forecast scenarios for resource demand 52, resource price 54 and resource availability 56, and a set of one or more forward contract structures 58 each of which specifies terms of a respective actual or proposed forward contract for procuring a respective resource.

The calculation engine 44 operates upon the data received from the production planner 46 and the resource procurer 48, and other data contained within data structures stored in various database tables accessible by the procurement risk management system 40. As explained in detail below, calculation engine 44 is operable to compute one or more metrics for evaluating risk in a sourcing portfolio and for evaluating how well a target sourcing strategy is implemented by the sourcing portfolio. The graphical user interface 42 presents these metrics in one or more procurement risk evaluation reports that enable the risks in a sourcing portfolio and a target sourcing strategy to be visualized and managed.

The procurement risk management system 40 may be implemented as one or more respective software modules operating on a computer. In one embodiment, the procurement risk management system 40 may be implemented as a Microsoft® Access® Database utilizing Visual Basic® for Applications (VBA) computer program operable as a spreadsheet tool in the Microsoft® Excel® application program, which is operable on a personal computer or a workstation. In general, the computer (or workstation) includes a processing unit, a system memory, and a system bus that couples the processing unit to the various components of the computer.

The processing unit may include one or more processors, each of which may be in the form of any one of various commercially available processors. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard and a mouse. Other input devices (e.g., a microphone, joystick, or touch pad) also may be provided. Information may be displayed to the user on a monitor. The computer also may include peripheral output devices, such as speakers and a printer. In addition, one or more remote computers may be connected to the computer over a local area network (LAN) or a wide area network (WAN) (e.g., the Internet).

III. Managing and Evaluating Procurement Risk

Figure 3:
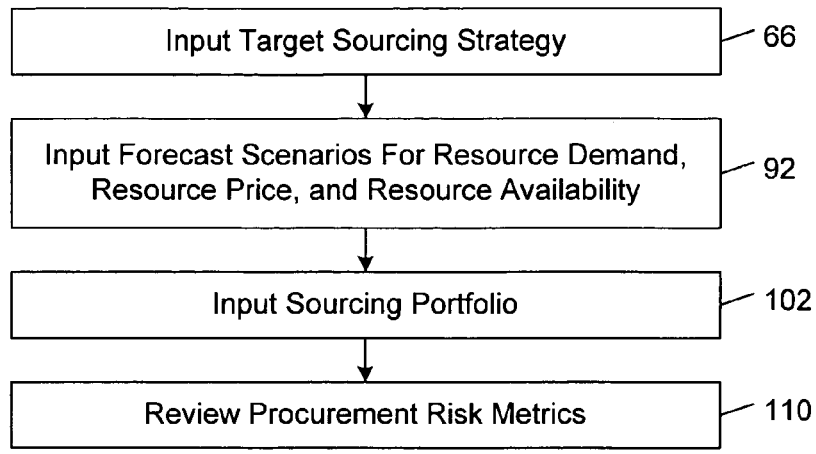
FIG. 3 is a flow diagram of an embodiment of a method of using the procurement risk management system of FIG. 2.

FIG. 3 shows an embodiment of a method by which the production planner 46 and the resource procurer 48 use the procurement risk management system 40 to manage and evaluate procurement risks. As explained in detail below, procurement risk management system 40 models various procurement risk related uncertainties using scenario-based analyses A. Inputting a Target Sourcing Strategy Referring to FIGS. 2-4, the graphical user interface 42 provides a protection profiles interface 64 that allows the production planner 46 to input the target sourcing strategy 50 for a resource (block 66). In the illustrated embodiment, the interface 64 includes fields for the production planner 46 to specify the target sourcing strategy 50 along three different dimensions or aspects: price protection 68, commitment protection 70, and total volume protection 72.

The price protection aspect of the target sourcing strategy specifies the target price-protected volumes of the resource to be supplied by the forward contracts 58 in the sourcing portfolio over a planning horizon. The price-protected volumes correspond to the quantities of the resource covered by either fixed price terms or price cap terms of the forward contracts 58 in the sourcing portfolio.

The commitment protection aspect of the target sourcing strategy specifies the target committed volumes of the resource that the manufacturer is obligated to purchase under the forward contracts 58 in the sourcing portfolio over the planning horizon. The committed volumes correspond to the quantities of the resource covered by minimum commitment or fixed quantity terms of the forward contracts 58 in the sourcing portfolio.

The total volume protection aspect of the target sourcing strategy specifies the target total volumes of the resource that can be supplied under the forward contracts 58 in the sourcing portfolio over the planning horizon. The total volumes correspond to the maximum quantities of the resource covered by either flexible or fixed quantity terms of the forward contracts 58 in the sourcing portfolio.

Figure 4:
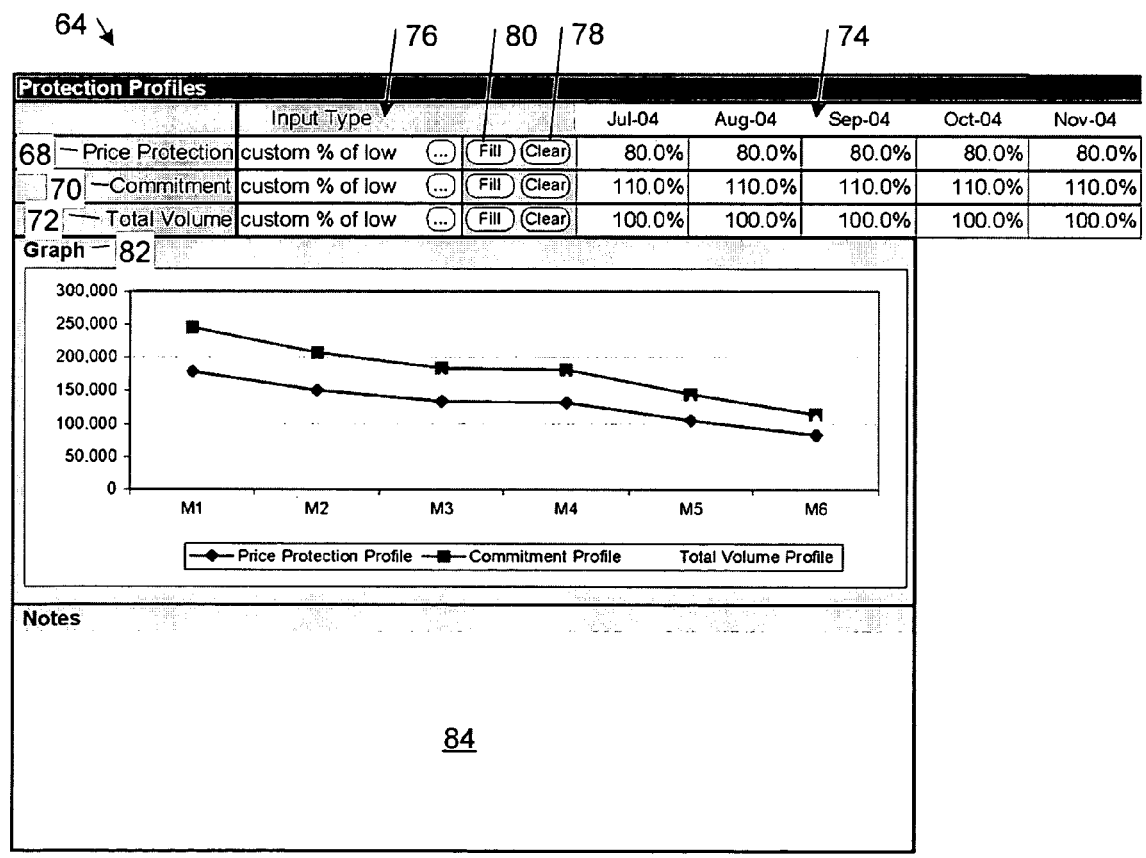
FIG. 4 is an embodiment of a graphical user interface for receiving inputs specifying one or more aspects of a target sourcing strategy for procuring a resource.
Figure 5:
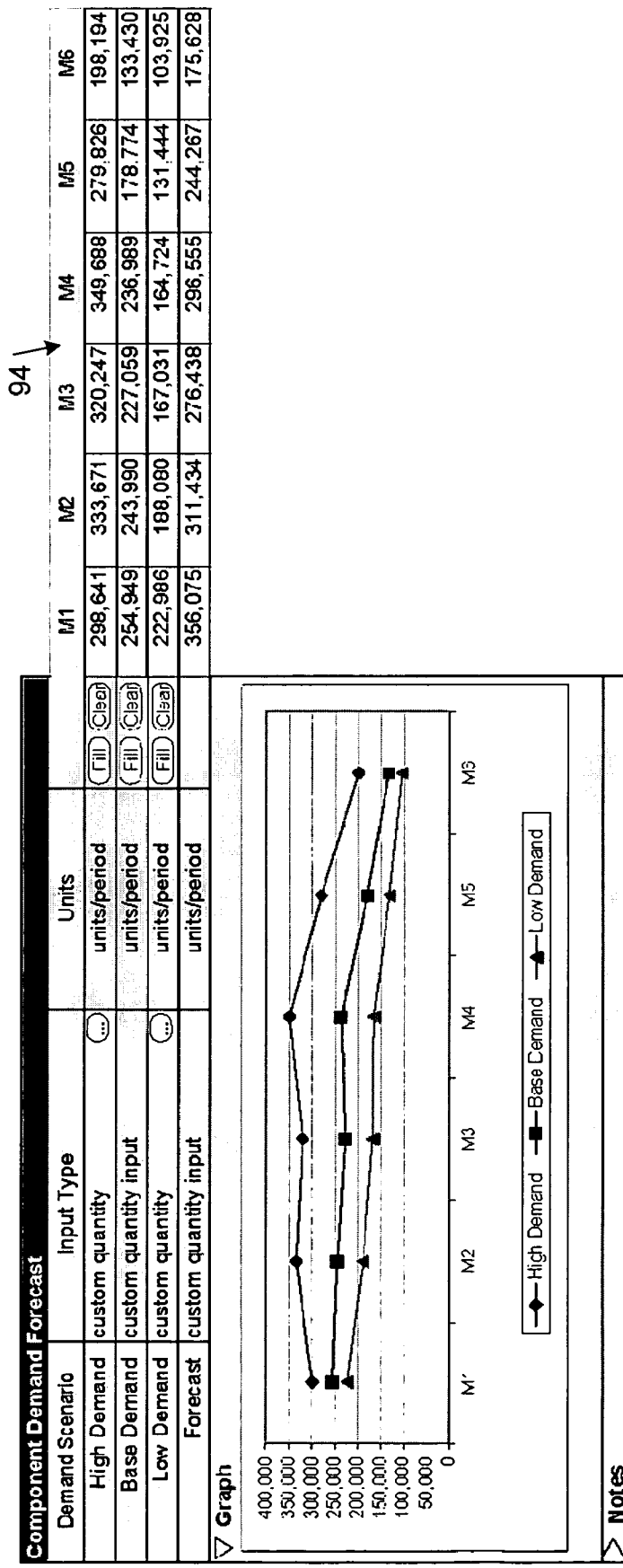
FIG. 5 is an embodiment of a graphical user interface for receiving inputs specifying multiple demand forecast scenarios for a resource.
Figure 6:
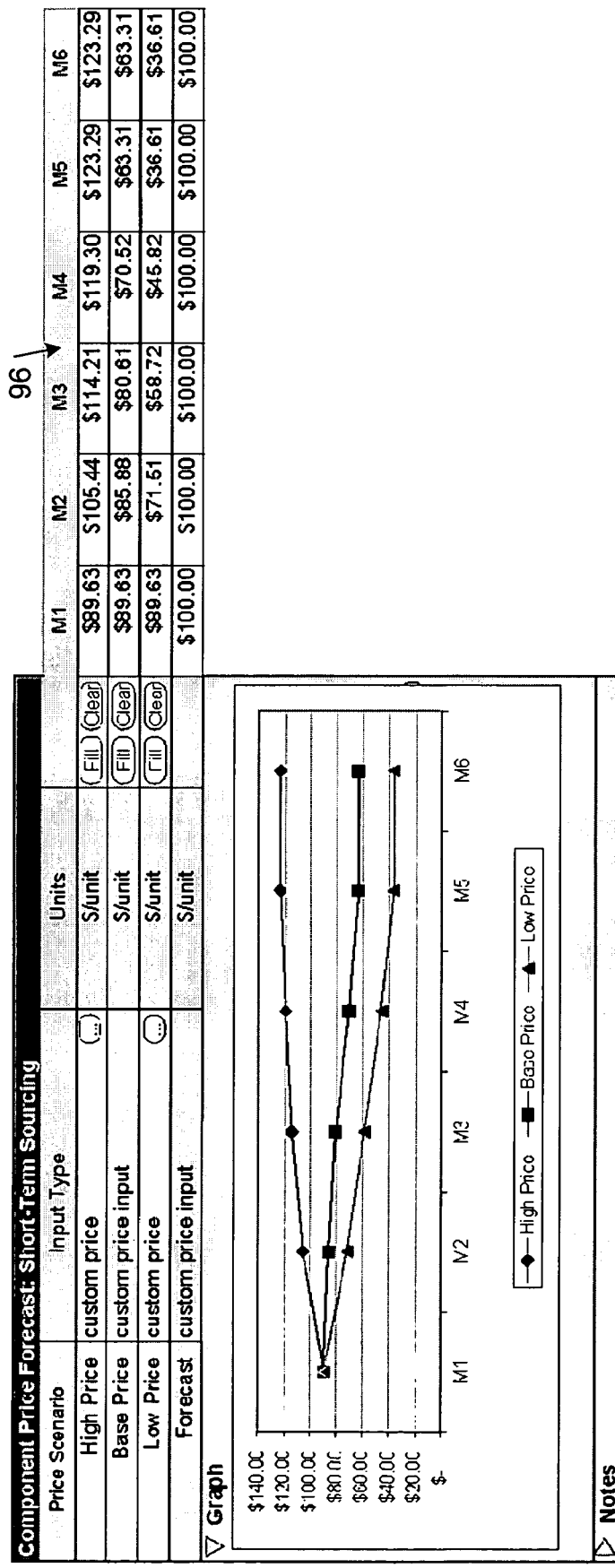
FIG. 6 is an embodiment of a graphical user interface for receiving inputs specifying multiple price forecast scenarios for a resource.
Figure 7:
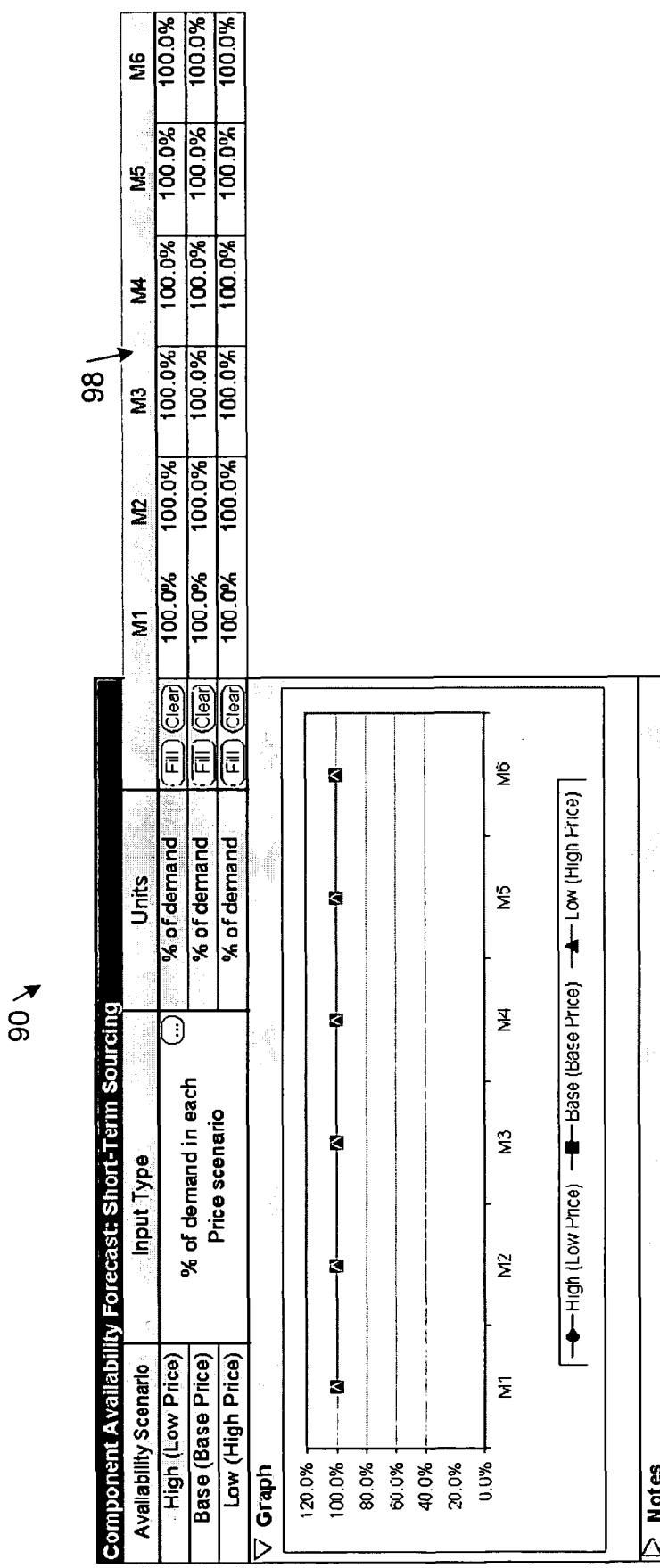
FIG. 7 is an embodiment of a graphical user interface for receiving inputs specifying multiple availability forecast scenarios for a resource.

Each aspect 68-72 of the target sourcing strategy is specified by a respective set of inputs 74 that are entered along a respective row of the protection profiles interface 64. The Input Type field 76 specifies whether the inputs 74 are entered in terms of a custom quantity, a custom percentage of a base demand scenario for the resource, or a custom percentage of a low demand scenario for the resource. The exemplary price protection, commitment, and total volume protection profiles shown in FIG. 4 are specified by inputs that are a custom percentage of the low demand scenario for the resource.

The Clear function 78 clears all of the input values in the corresponding row.

The Fill function 80 allows the production planner 46 to input one or more values in the production profile inputs 74, and the procurement risk management system 40 automatically fills in the blanks through linear interpolation. In another embodiment, the production planner 46 may specify an initial condition and a growth rate, rather than using linear interpolation. The logic for the Fill function 78 is as follows. The same logic applies to any row of inputs, regardless of units.

1. If all cells are blank or zero, generate an error message explaining the function of the Fill feature.
2. If only one cell in the row has a positive value, assign that value to all other cells in the row to produce a constant profile.
3. If there are two or more cells with non-zero values, linearly interpolate between the input values.
   a. For blank cells between two non-zero input values: if current blank cell is at period j and is between cells at periods i and k, such that i<j<k, then:

$$\text{value}(j) = \text{value}(i) + \left(\frac{j-i}{k-i}\right)(\text{value}(k) - \text{value}(i))$$

b. For a blank cell at period i preceding the first two non-zero cells at periods j and k:

$$\text{value}(i) = \text{value}(j) - \left(\frac{j-i}{k-j}\right)(\text{value}(k) - \text{value}(j))$$

c. For a blank cell at period k following the last two non-zero cells at periods i and j:

$$\text{value}(k) = \text{value}(j) + \left(\frac{k-j}{j-i}\right)(\text{value}(j) - \text{value}(i))$$

The protection profiles interface 64 includes a Graph button 82 that the production planner 46 may select to display graphs of the protection profile inputs 74 over the planning horizon.

The Notes window 84 contains user notes relating to one or more aspects of the target sourcing strategy.

B. Inputting Forecast Scenarios

Referring to FIGS. 2, 5, 6, and 7, the graphical user interface 42 provides a Component Demand Forecast window 86 (FIG. 5), a Component Price Forecast window 88 (FIG. 6), and a Component Availability Forecast window 90 (FIG. 7) that allows the resource procurer 48 to input, for each period of the planning horizon, values for demand, price and availability forecast scenarios for a resource (block 92; FIG. 2). The Component Demand Forecast window 86 contains information relating to high, base and low demand forecast scenarios over time. The Component Price Forecast window 88 contains information relating to high, base and low price forecast scenarios over time. The Component Availability Forecast window 90 contains information relating to high, base and low availability forecast scenarios over time.

The graphical user interfaces presented in the Component Demand Forecast window 86, the Component Price Forecast window 88 and the Component Availability window 90 include input menus 94, 96, 98 of options for creating low and high forecast scenarios from expected (or "base") forecasts. The base forecasts may be obtained using any one of a wide variety of known forecasting techniques.

As explained below, each input menu 94, 96, 98 presents the resource procurer 48 with options for inputting forecast scenarios. For example, in some cases price uncertainty may not be important to the analysis. In these cases, the resource procurer 48 conveniently may select from a menu the way in which the low and high scenarios are to be generated, instead of having to manually estimate and input all values for the low and high scenarios. The menu choices also provide some useful benchmarks for the resource procurer 48 when developing custom scenarios. For example, procurement risk management system 40 may suggest what a "high volatility" scenario would look like and may have some context for what kind of commodities or situations in which the "high volatility" would apply. With this information, the resource procurer 48 may be better guided and better grounded in developing custom forecast inputs. In addition to offering simple options for generating high and low scenarios, the process of inputting the information is simplified. For example, if a particular planning horizon has twenty-four periods, it would be tedious for the resource procurer 48 to have to enter manual inputs for each period. In the illustrated embodiment, the resource procurer 48 may create period-by-period forecasts by entering only a few key inflection points and having the procurement risk management system 40 fill in the blanks in response to selection of the appropriate Fill button. The specific menu options and mechanics are described below.

The demand forecast menu 94 has the following input types:

| Choice under "input type" menu | Corresponding units |
| --- | --- |
| custom quantity input | units/period |
| custom % of base | % of base demand scenario |
| stable but random demand (process) | % of base demand scenario |
| uncertain demand growth (product) | % of base demand scenario |
| Highly uncertain demand growth (new product) | % of base demand scenario |

The price forecast menu 96 has the following input types:

| Choice under "input type" menu | Corresponding units |
| --- | --- |
| custom price input | $/unit |
| custom % of base | % of base price scenario |
| template 1: fairly predictable price | % of base price scenario |
| template 2: somewhat uncertain price | % of base price scenario |
| template 3: highly uncertain price | % of base price scenario |

The % input is a custom input that is a more intuitive or familiar way of thinking about the input. It is also in a generic form that may be leveraged across different products or cases, regardless of base demand level. The other three types of inputs are standard templates (in % terms) that the resource procurer 48 may apply. The procurement risk management system 40 provides the formulas or data for these templates in the model, based on demand or price scenario templates. Details regarding the scenario templates are provided in co-pending U.S. application Ser. No. 10/264,474, filed Oct. 3, 2002, by Greg C. Jacobus et al., and entitled "MANAGING PROCUREMENT RISK", which is incorporated herein by reference. The procurement risk management system 40 also may include comments about what types of products or conditions are consistent with high, medium, and low volatility.

The inputs for the availability forecast menu 98 may be entered in terms of percentage of demand in each price forecast scenario or in terms of percentage of demand in each demand forecast scenario. In these embodiments, the availability inputs are presented to the resource procurer 48 in a way that makes correlations more intuitive and allows more flexibility in how to input availability. This user interface is dynamic in the sense that scenario labels refer to either price or demand scenarios. This has the additional advantage of not requiring the resource procurer 48 to think about "low", "base", and "high" availability scenarios because the linkage to price or demand scenarios is readily apparent. In other embodiments, the resource procurer 48 may specify availability in absolute quantity terms, rather than percentage terms. In the illustrated embodiment, the resource procurer 48 may select among correlations that range from perfectly positive, to no correlation, to perfectly negative. A strongly negative correlation, for example, means that when price follows the high scenario, availability is very likely to follow the low scenario. In this example, if price tends to be high when availability is low, profits are more likely to take a simultaneous hit from both higher material costs and shortage costs.

Each of the Component Demand Forecast window 86, Component Price Forecast window 88, and Component Availability Forecast window 90 includes a respective Graph button 94, 96, 98 that the resource procurer 48 may select to display a graph of the tabular data contained in the corresponding window 86-90. Note that the demand and price forecast graphs always display the forecasts in absolute unit terms.

C Inputting the Sourcing Portfolio

Referring to FIGS. 2 and 8, the graphical user interface 42 provides a sourcing options interface 100 that allows the resource procurer 48 to input the forward contracts 58 in the sourcing portfolio for a resource (block 102; FIG. 2).

The resource procurer 48 may specify the terms of each forward contract 58 through a respective sourcing option window 104. In general, the resource procurer 48 may specify short-term contracts, long-term contracts, inventory buys, special deals, and other sourcing commitments. These sourcing options can be valued by specifying a combination of individual quantity and pricing terms over time for each sourcing option. Among the quantity terms that can be specified are: fixed quantity, minimum and/or maximum quantity, and fixed and flexible percentage of total available market (TAM). Among the pricing terms that can be specified are: market-based with specified discounts, fixed price, price caps and floors, and upfront payment and option premium. The illustrated Sourcing Option corresponds to a fixed quantity commitment over the planning horizon with a price specified as a percentage below the price forecast with a price cap.

The resource procurer 48 also may specify rebates and penalties. These inputs may be specified using "Additional cash payments (net buyer to supplier)" and "Buyer penalties" inputs. Details regarding these inputs are provided in co-pending U.S. application Ser. No. 10/264,474, filed Oct. 3, 2002, by Greg C. Jacobus et al., and entitled "MANAGING PROCUREMENT RISK".

Figure 9:
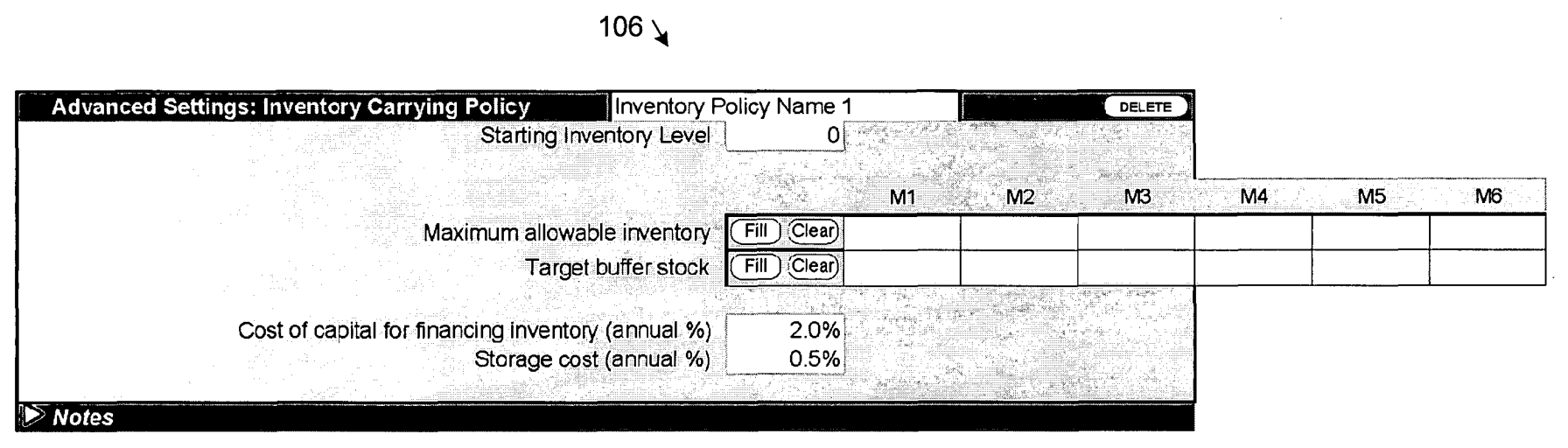

As shown in FIG. 9, the resource procurer 48 also may specify an inventory carrying policy in an Advanced Settings: Inventory Carrying Policy window 106. Among the inventory inputs that the resource procurer 48 may specify are the following: starting inventory level; maximum allowable inventory; target buffer stock level; cost of capital for financing inventory (annual); and storage cost (annual). The resource procurer 48 also may specify excess inventory salvage value as a percentage of scenario prices. In the illustrated example, it is assumed that if there is excess inventory in the last period, firm 14 can value it at 80% of the current market price in the low recovery scenario, at 90% of the current market price in the base recovery scenario, and at 100% of the current market price in the high recovery scenario.

The procurement risk management system 40 will try to maintain the specified target inventory buffer level when computing an optimal resource sourcing mix. The procurement risk management system 40 tries to maintain inventory close to the "target buffer stock" level. It draws on this inventory only to prevent shortages. It buys and holds inventory only when availability is good enough to replenish the inventory stock back towards the buffer level. If the initial inventory level is greater than the target level, the procurement risk management system 40 gives preference to depleting inventory over buying from market. If the inventory level is ever above the maximum allowed inventory level (due to contract commitments exceeding demand), then the procurement risk management system 40 sells the excess back on the market at a value specified in the "Excess Inventory Salvage Value" inputs. For example, in electricity we would want to set the maximum value to zero, since the electricity cannot be stored. Initial inventory level is an input, and the difference in market value of inventory from the last period to the first period is added to the total cost and margin NPVs (Net Present Values). Final period inventory is not sold off as excess; only inventory above the maximum allowable level is sold as excess. If the resource procurer 48 wanted to sell off all inventory at the end of the last period, then a user would specify that the maximum allowable inventory level in the last period as zero.

D. Reviewing Procurement Risk Metrics

Figure 10:
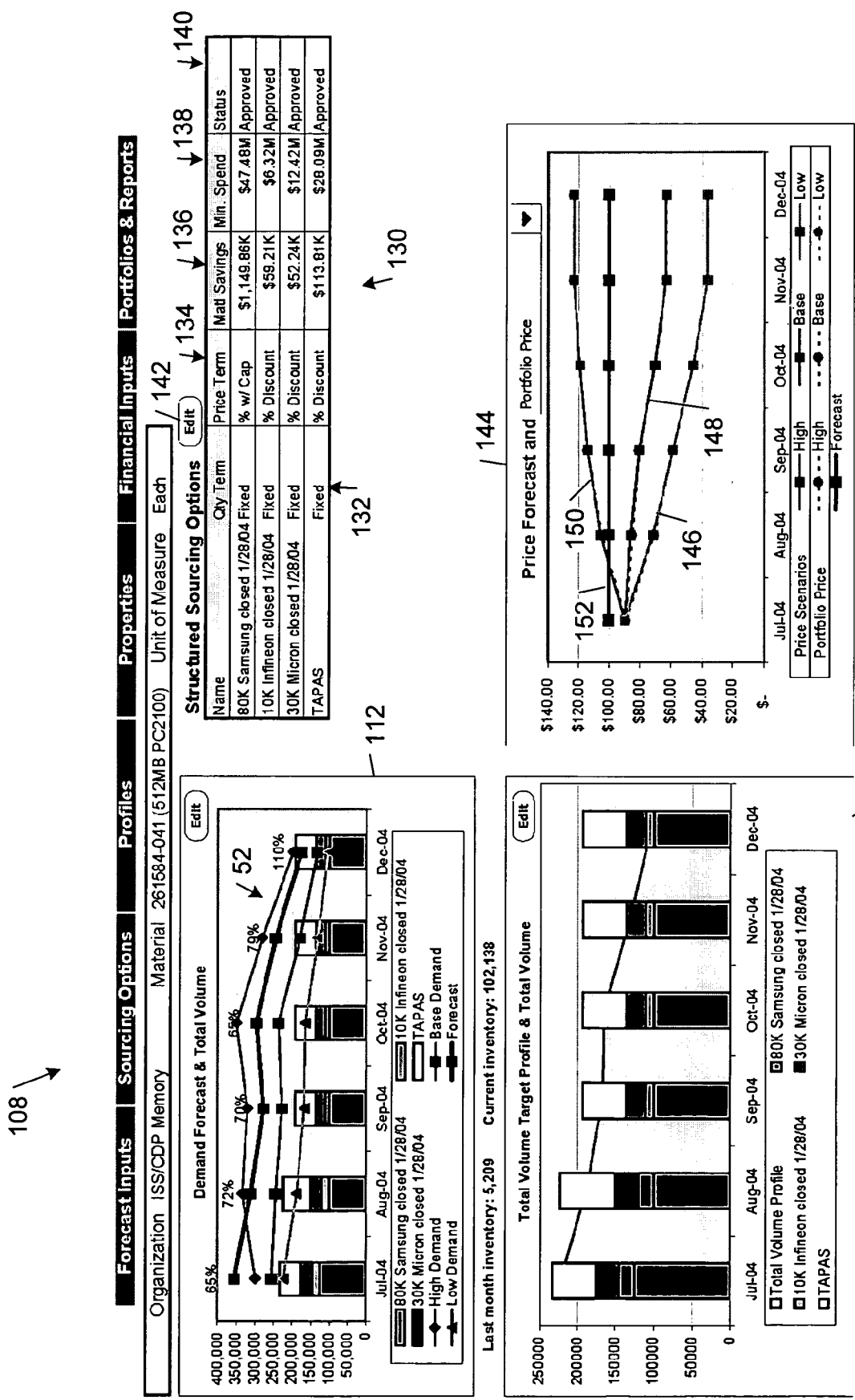
FIG. 10 is an embodiment of a graphical user interface for presenting four procurement risk evaluation reports.

Referring to FIGS. 2 and 10, after the production planner 46 and the resource procurer 48 have entered the various inputs 50-58 into the procurement risk management system 40 through the graphical user interface 42, the calculation engine 44 computes various metrics for evaluating the sourcing portfolio and the target sourcing strategy. The graphical user interface 42 presents the computed metrics in procurement risk evaluation reports that are displayed in an easy-to-use, customizable, single-screen evaluation "desk" 108 that allows the production planner 46 and the resource procurer 48 to clearly and quickly review the procurement risk metrics (block 110; FIG. 2).

1. Reviewing the Quality of the Sourcing Portfolio in Terms of Contract Quantities The evaluation desk 108 includes a customizable user interface and associated analytics for presenting graphical views that enable the production planner 46 and the resource procurer 48 to evaluate the quality of the sourcing portfolio in terms of contract quantities (or volumes). In particular, evaluation desk 108 includes an interface 112 for displaying graphical views of the input demand scenarios 52 concurrently with the quantities of the resource provided under different respective terms of the forward contracts in the sourcing portfolio. The graphical views shown in interface 112 compare line graphs of the demand forecast scenarios and a user-selected choice of contract volumes: price-protected volume; fixed quantity commitments; and total fixed and flexible quantity commitments. The user also has the option of viewing the contract volumes as stacked bar charts, as shown in FIG. 10. This allows the user to see the contract volumes broken out by contract.

Figure 11A:
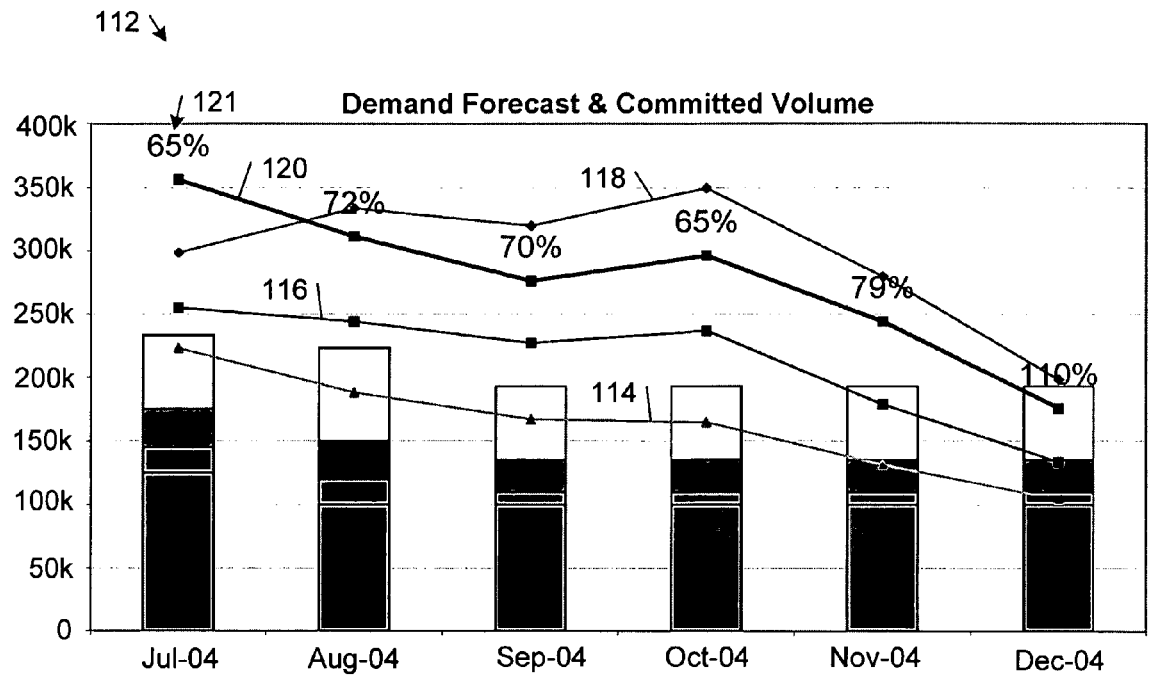
FIG. 11A is an embodiment of a graphical user interface presenting a procurement risk evaluation report comparing demand forecast scenarios to the volume of a resource committed to be supplied under the terms of forward contracts in a sourcing portfolio.

Referring to FIG. 11A, in a first mode of operation, the interface 112 shows line graphs of the low demand forecast 114, the base demand forecast 116, and the high demand forecast 118 plotted over the planning horizon. The contract volumes are shown as stacked bar charts representing the sum of the minimum quantities of the resource committed by be purchased by the firm 14 under the terms of the forward contracts 58 in the sourcing portfolio. The interface 112 also shows a line graph 120 of the forecast demand for the resource and the percentage 121 of the forecasted demand that is met by the committed volumes of the resource under the sourcing portfolio for each period of the planning horizon.

Figure 11B:
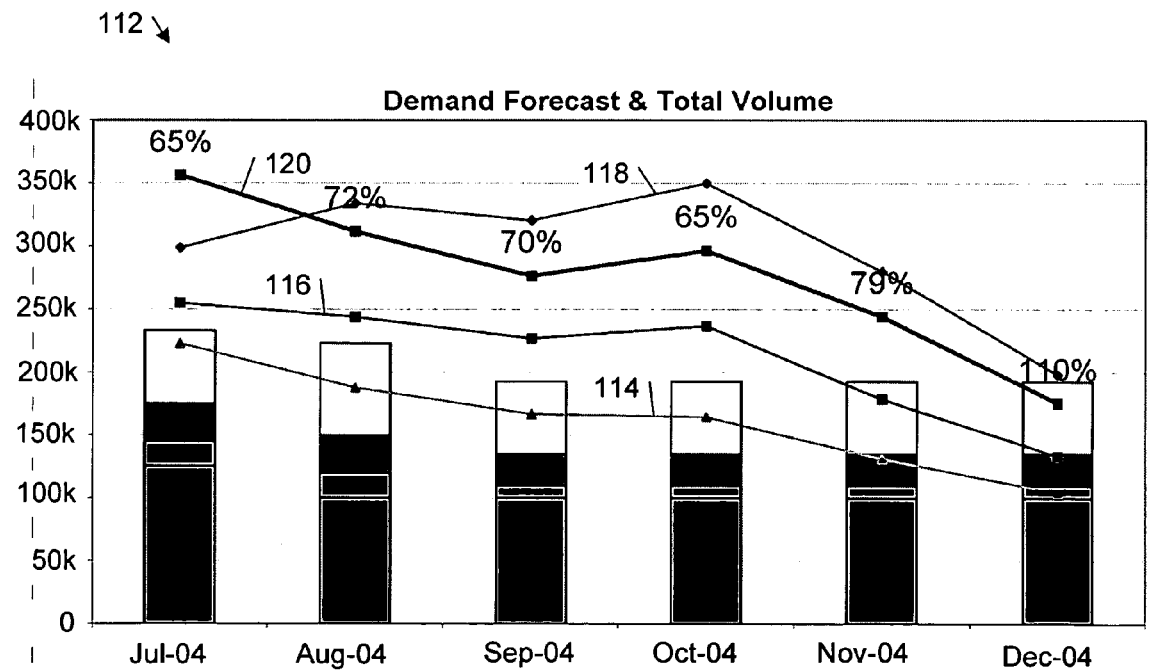
FIG. 11B is an embodiment of a graphical user interface presenting a procurement risk evaluation report comparing demand forecast scenarios to the total volume of a resource that can be supplied under the terms of forward contracts in a sourcing portfolio.

Referring to FIG. 11B, in a second mode of operation, the interface 112 shows line graphs of the low demand forecast 114, the base demand forecast 116, and the high demand forecast 118 plotted over the planning horizon. The contract volumes are shown as stacked bar charts representing the sum of the maximum quantities of the resource that can be purchased by the firm 14 under the fixed quantity and the flexible quantity terms of the forward contracts 58 in the sourcing portfolio. The interface 112 also shows a line graph 120 of the forecast demand for the resource and the percentage 122 of the forecasted demand that is met by the committed volumes of the resource under the sourcing portfolio.

Figure 11C:
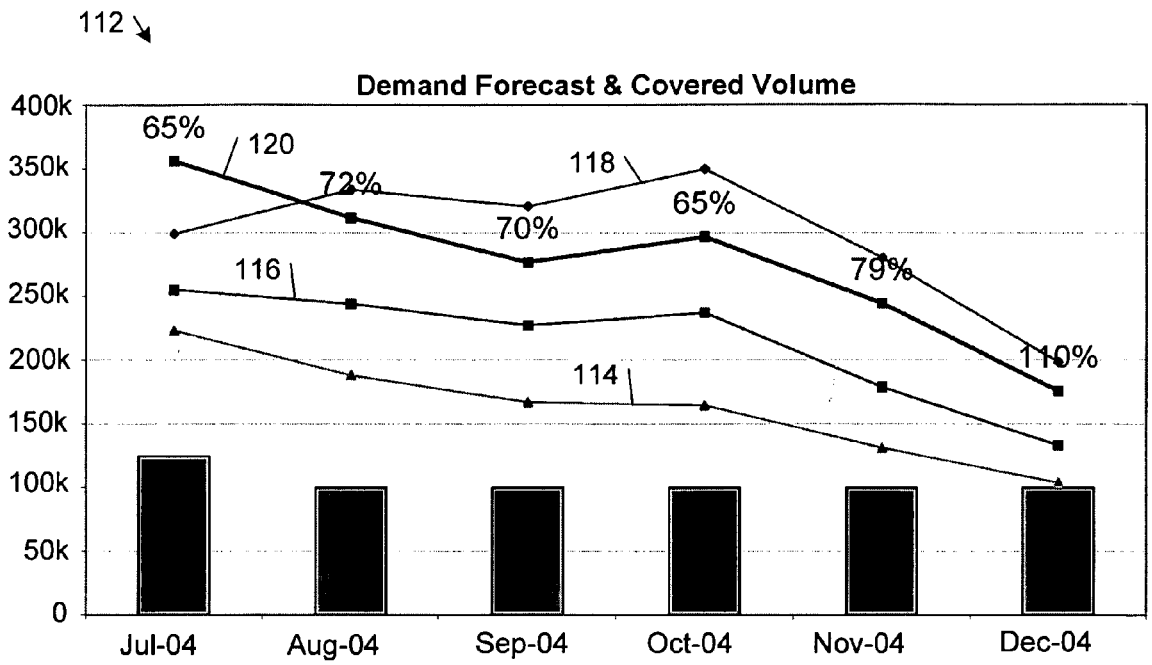
FIG. 11C is an embodiment of a graphical user interface presenting a procurement risk evaluation report comparing demand forecast scenarios to the volume of a resource covered under price-protection terms of forward contracts in a sourcing portfolio.

Referring to FIG. 11C, in a third mode of operation, the interface 112 shows line graphs of the low demand forecast 114, the base demand forecast 116, and the high demand forecast 118 plotted over the planning horizon. The contract volumes are shown as bar charts representing the price-protected volume of the resource covered by either fixed prices or price cap terms of the forward contracts 58 in the sourcing portfolio. The interface 112 also shows a line graph 120 of the forecast demand for the resource and the percentage 122 of the forecasted demand that is met by the committed volumes of the resource under the sourcing portfolio.

2. Reviewing the Quality of the Target Sourcing Strategy Implementation

Referring back to FIG. 10, the evaluation desk 108 also includes a user interface 122 that presents graphical views that enable the production planner 46 and the resource procurer 48 to evaluate how well the target sourcing strategy 50 is implemented by the forward contracts 58 in the sourcing portfolio. In particular, the interface 122 displays graphical views of quantities of the resource specified by each aspect of the target sourcing strategy concurrently with the quantities of the resource provided under corresponding terms of the forward contracts in the sourcing portfolio.

Figure 12A:
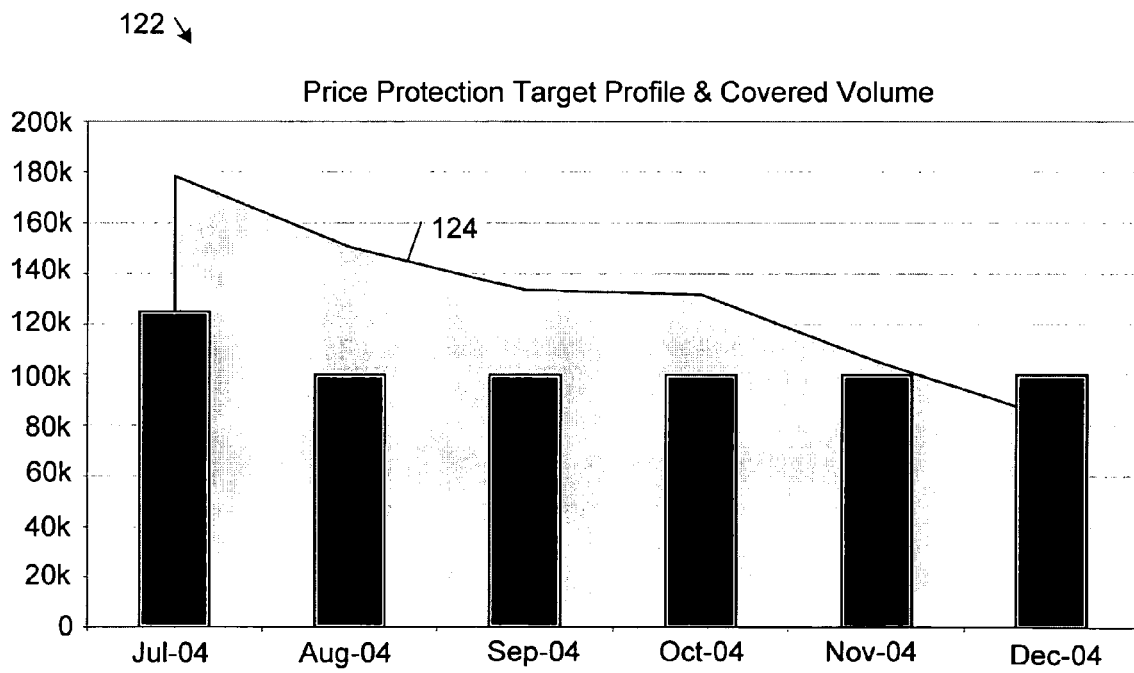
FIG. 12A is an embodiment of a graphical user interface presenting a procurement risk evaluation report comparing the volume of a resource covered under price-protection terms of forward contracts in a sourcing portfolio and the volume of the resource specified by a price protection aspect of a target sourcing strategy.

Referring to FIG. 12A, in a first mode of operation, the interface 122 shows a graph 124 that corresponds to the price protection aspect of the target sourcing strategy 50. In particular, graph 124 plots the quantities of the resource that are specified in the target sourcing strategy 50 as being covered by fixed price and price cap terms of the forward contracts 58 in the sourcing portfolio. The contract volumes are shown as bar charts representing the price-protected volume of the resource covered by either fixed prices or price cap terms of the forward contracts 58 in the sourcing portfolio.

Figure 12B:
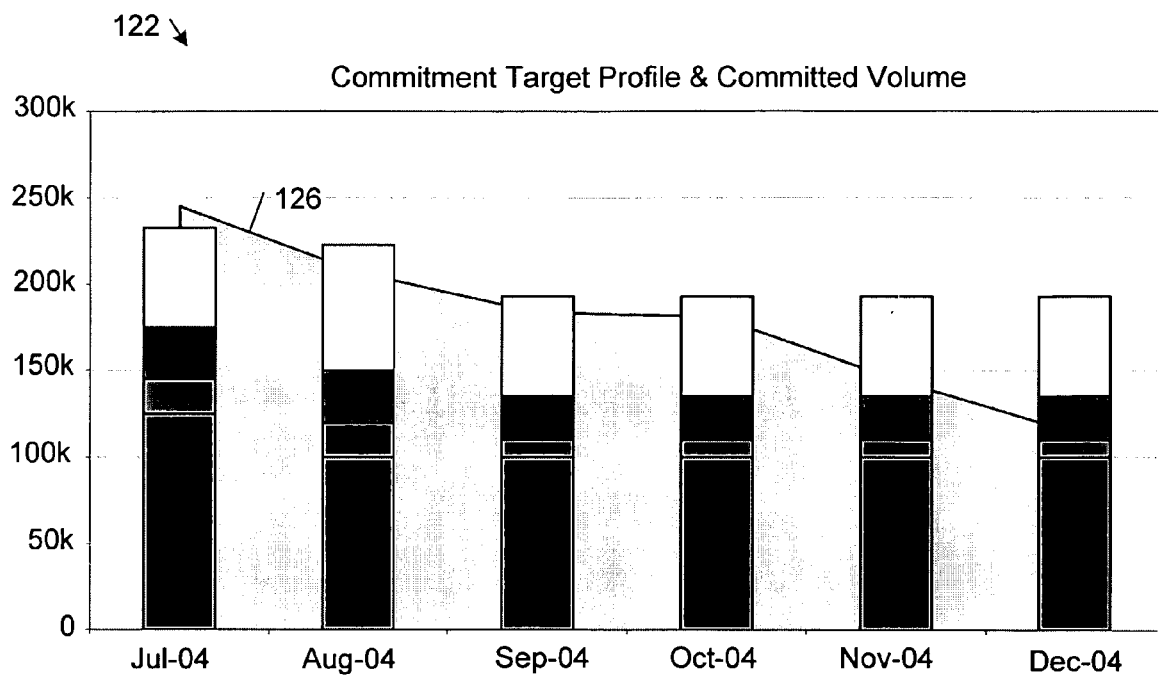
FIG. 12B is an embodiment of a graphical user interface presenting a procurement risk evaluation report comparing the volume of a resource committed to be supplied under the terms of forward contracts in a sourcing portfolio and the volume of the resource specified by a committed volume protection aspect of a target sourcing strategy.

Referring to FIG. 12B, in a second mode of operation, the interface 122 shows a graph 126 that corresponds to the committed volume protection aspect of the target sourcing strategy 50. In particular, graph 126 plots the quantities of the resource that are specified in the target sourcing strategy 50 as being covered by minimum quantity (quantity floor) terms of the forward contracts 58 in the sourcing portfolio. The contract volumes are shown as stacked bar charts representing the sum of the minimum quantities of the resource committed by be purchased by the firm 14 under the terms of the forward contracts 58 in the sourcing portfolio.

Figure 12C:
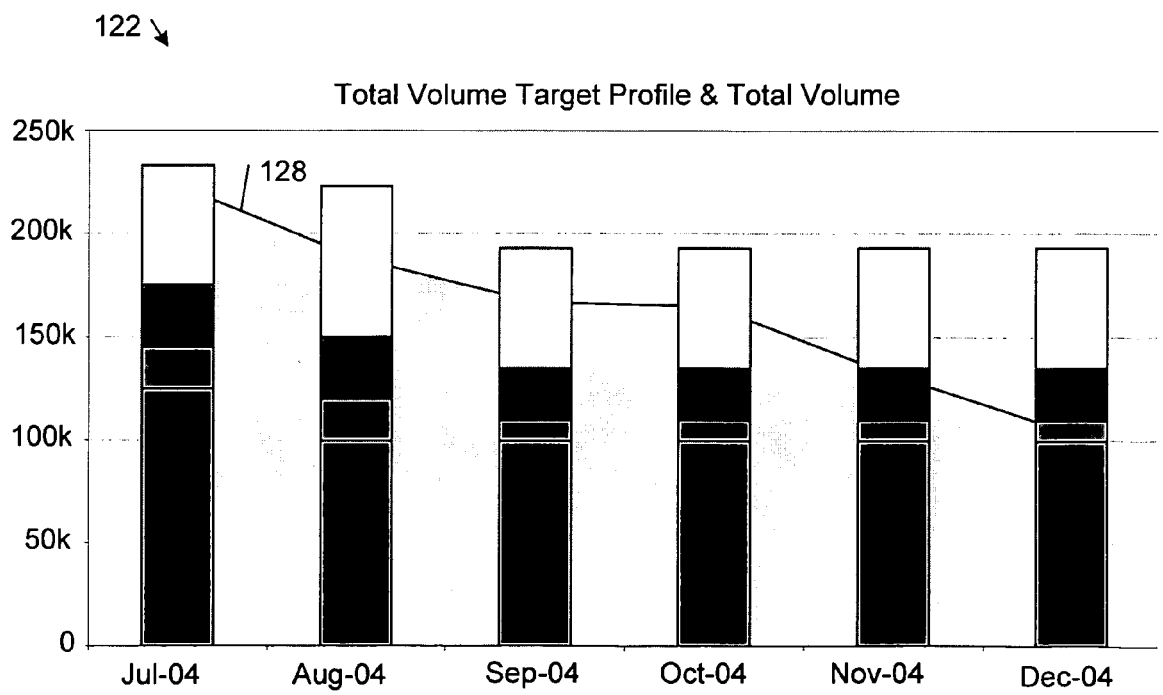
FIG. 12C is an embodiment of a graphical user interface presenting a procurement risk evaluation report comparing the total volume of a resource that can be supplied under the terms of forward contracts in a sourcing portfolio and the total volume of the resource specified by a total volume protection aspect of a target sourcing strategy.

Referring to FIG. 12C, in a third mode of operation, the interface 122 shows a graph 128 that corresponds to the total volume protection aspect of the target sourcing strategy 50. In particular, graph 128 plots the quantities of the resource that are specified in the target sourcing strategy 50 as being covered by minimum quantity (quantity floor) and quantity cap terms of the forward contracts 58 in the sourcing portfolio. The contract volumes are shown as stacked bar charts representing the sum of the maximum quantities of the resource that can be purchased by the firm 14 under the fixed quantity and the flexible quantity terms of the forward contracts 58 in the sourcing portfolio.

3. Reviewing the Contract Terms of the Sourcing Portfolio

Referring back to FIG. 10, the evaluation desk 108 includes a user interface 130 that allows the production planner 46 and the resource procurer 48 to quickly view key information about the contracts in the sourcing portfolio. In particular, the user interface 130 presents a tabular summary of contract quantity terms 132, contract price terms 134, material savings 136, liabilities 138, and contract status 140. The material savings 136 is calculated as the expected value of the differences between purchasing the optimal purchase quantities from the market and purchasing those same quantities through the corresponding forward contracts. Liabilities 138 are calculated as the expected value of the sum of the minimum material cost; buyer penalties, and cash payments for the corresponding forward contracts. Additional details regarding the computation of material savings 136 and liabilities 138 are provided in co-pending U.S. application Ser. No. 10/264,474, filed Oct. 3, 2002, by Greg C. Jacobus et al., and entitled "MANAGING PROCUREMENT RISK".

Selection of the Edit button 142 opens a menu that allows the user to select the type of contract data that is displayed in user interface 130. In particular, the user may elect to have the interface 130 show or hide some or all of the following tabular data: contract quantity terms 132, contract price terms 134, material savings 136, liabilities 138, and contract status 140. The menu opened by selection of the Edit button 142 also allows the user limit the data presented in user interface 130 to only the contract data corresponding to contracts with a status of "Approved".

4. Reviewing the Quality of the Sourcing Portfolio in Terms of Contract Prices

Figure 13:
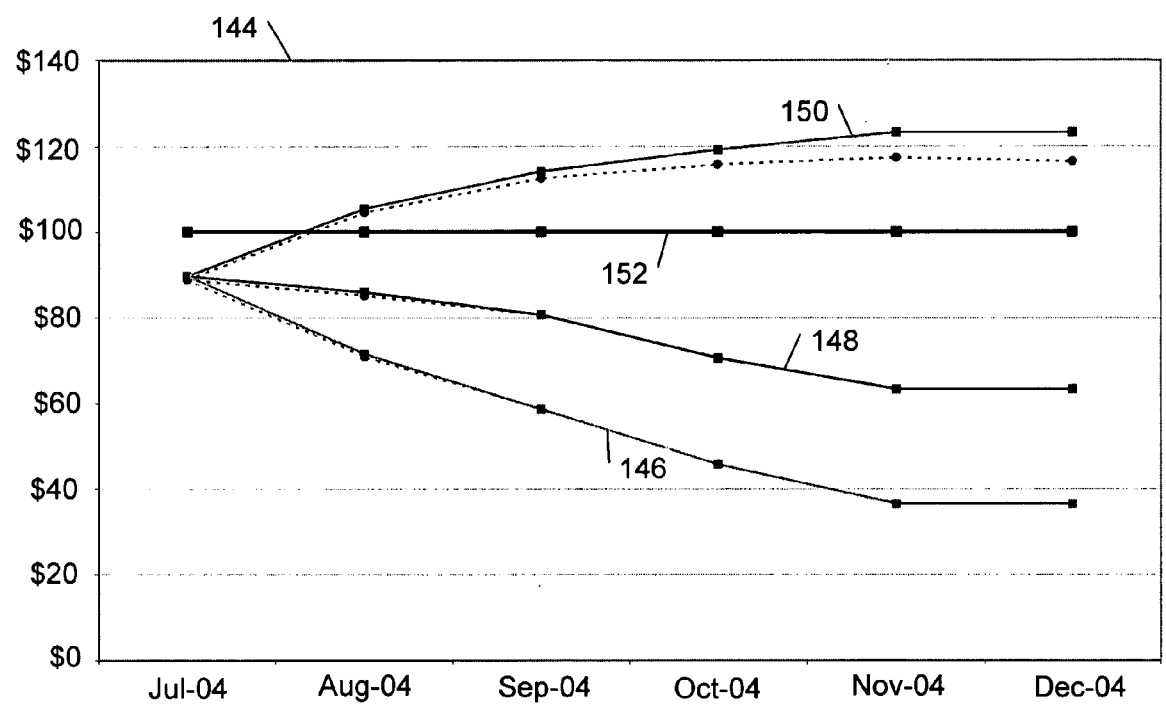
FIG. 13 is an embodiment of a graphical user interface presenting price forecast scenarios for a resource and a price of the resource computed from the terms of forward contracts in a sourcing portfolio.

Referring to FIGS. 10 and 13, the evaluation desk 108 additionally includes a customizable user interface and associated analytics for presenting graphical views that enable the production planner 46 and the resource procurer 48 to evaluate the quality of the sourcing portfolio in terms of contract prices. In particular, the evaluation desk 108 includes a user interface 144 that allows the production planner 46 and the resource procurer 48 to compare the short-term price forecast against the prices of purchasing optimal quantities from the sourcing portfolio and short-term sourcing. In particular, the user interface 144 presents line graphs 146, 148, 150 corresponding to the low, base and high price forecast scenarios for the resource and a line graph 152 that corresponds to the average of the prices of purchasing optimal quantities from the sourcing portfolio and short-term sourcing for the resource. Details regarding the computation of the optimal quantities purchased from the sourcing portfolio and short-term sourcing are provided in co-pending U.S. application Ser. No. 10/264,474, filed Oct. 3, 2002, by Greg C. Jacobus et al., and entitled "MANAGING PROCUREMENT RISK". The user interface 144 also allows the user to view the price forecast scenarios 146-150 against the price of the resource specified in a particular forward contract in the sourcing portfolio.

IV. Conclusion

Other embodiments are within the scope of the claims. For example, the systems and methods described herein are not limited to any particular hardware or software configuration, but rather they may be implemented in any computing or processing environment, including in digital electronic circuitry or in computer hardware, firmware, or software.

What is claimed is:

1. A method, comprising:
   receiving inputs specifying one or more forward contracts in a sourcing portfolio for procuring a resource from one or more suppliers;
   receiving inputs specifying one or more aspects of a target sourcing strategy for procuring the resource;
   determining a procurement risk evaluation report comparing the sourcing portfolio and the target sourcing strategy; and
   presenting the procurement risk evaluation report;
   wherein the receiving of the inputs specifying one or more forward contract items, the receiving of the inputs specifying one or more aspects of a target sourcing strategy, and the determining are performed by a computer.

2. The method of claim 1, wherein the receiving of inputs specifying one or more forward contracts comprises receiving inputs specifying terms of each forward contract.

3. The method of claim 2, wherein the receiving of inputs specifying forward contract terms comprises receiving for each forward contract inputs specifying one or more of a quantity cap, a quantity floor, a price, a price cap, and a price floor in one or more periods of a planning horizon.

4. The method of claim 3, further comprising computing unspecified forward contract term inputs by interpolating between received forward contract term inputs.

5. The method of claim 2, wherein the receiving of inputs specifying forward contract terms comprises receiving for each forward contract an input labeling the quantity terms of the corresponding forward contract and an input labeling the price terms of the corresponding forward contract.

6. The method of claim 1, wherein the receiving of inputs specifying the one or more aspects of the target sourcing strategy comprises receiving inputs specifying quantities of the resource to be supplied by the sourcing portfolio in respective periods of a planning horizon.

7. The method of claim 6, wherein the quantity-specifying inputs are received for a price protection aspect of the target sourcing strategy.

8. The method of claim 7, wherein the price protection aspect of the target sourcing strategy corresponds to a specification of quantities of the resource covered by at least one of price cap terms and fixed price terms of the forward contracts in the sourcing portfolio.

9. The method of claim 6, wherein the quantity-specifying inputs are received for a quantity protection aspect of the target sourcing strategy.

10. The method of claim 9, wherein the quantity protection aspect of the target sourcing strategy corresponds to a specification of quantities of the resource covered by at least one of quantity floor terms and quantity cap terms of the forward contracts in the sourcing portfolio.

11. The method of claim 6, wherein the input quantities of the resource are specified as absolute quantities values.

12. The method of claim 6, wherein the input quantities of the resource are specified relative to a demand forecast scenario for the resource.

13. The method of claim 6, further comprising computing unspecified resource quantity inputs by interpolating between the received resource quantity inputs.

14. The method of claim 1, wherein presenting the procurement risk evaluation report comprises displaying a plot of quantities of the resource provided under terms of the forward contracts in the sourcing portfolio and a plot of quantities of the resource specified by a corresponding aspect of the target sourcing strategy over a planning horizon.

15. The method of claim 14, wherein the plotted aspect of the target sourcing strategy corresponds to a commitment target profile specifying minimum quantities of the resource committed to being supplied under the sourcing portfolio over the planning horizon.

16. The method of claim 15, wherein the plotted sourcing portfolio quantities correspond to total quantities of the resource covered by quantity floor terms of the forward contracts in the sourcing portfolio over the planning horizon, wherein the commitment target profile and the total sourcing portfolio quantities are displayed concurrently in the procurement risk evaluation report.

17. The method of claim 14, wherein the plotted aspect of the target sourcing strategy corresponds to a price protection target profile specifying quantities of the resource covered by fixed price and price cap terms of the forward contracts in the sourcing portfolio over the planning horizon.

18. The method of claim 17, the plotted sourcing portfolio quantities correspond to total quantities of the resource covered by fixed price and price cap terms of the forward contracts in the sourcing portfolio over the planning horizon, wherein the price protection target profile and the total sourcing portfolio quantities are displayed concurrently in the procurement risk evaluation report.

19. The method of claim 14, wherein the plotted aspect of the target sourcing strategy corresponds to a total volume protection target profile specifying quantities of the resource covered by quantity floor and quantity cap terms of the forward contracts in the sourcing portfolio over the planning horizon.

20. The method of claim 19, the plotted sourcing portfolio quantities correspond to total quantities of the resource covered by quantity floor and quantity cap terms of the forward contracts in the sourcing portfolio over the planning horizon, wherein the total volume protection target profile and the total sourcing portfolio quantities are displayed concurrently in the procurement risk evaluation report.

21. The method of claim 1, wherein the presenting of the procurement risk evaluation report comprises displaying a plot of demand forecast scenarios for the resource and a plot of quantities of the resource provided under terms of the forward contracts in the sourcing portfolio over a planning horizon.

22. The method of claim 21, wherein the plotted sourcing portfolio quantities of the resource correspond to minimum quantities of the resource committed to being supplied under the sourcing portfolio over the planning horizon.

23. The method of claim 21, wherein the plotted sourcing portfolio quantities of the resource correspond to quantities of the resource covered by fixed price and price cap terms of the forward contracts in the sourcing portfolio over the planning horizon.

24. The method of claim 21, wherein the plotted sourcing portfolio quantities of the resource correspond to quantities of the resource covered by quantity floor and quantity cap terms of the forward contracts in the sourcing portfolio over the planning horizon.

25. The method of claim 1, further comprising receiving inputs specifying a forecast scenario for an economic attribute of the resource over the planning horizon.

26. The method of claim 25, wherein the receiving of inputs specifying the forecast scenario comprise receiving demand attribute inputs corresponding to a demand forecast scenario for the resource specified in absolute quantity terms, specified in relative quantity terms, or generated based on a demand template for the resource.

27. The method of claim 25, wherein the receiving of inputs specifying the forecast scenario comprise receiving price attribute inputs corresponding to a price forecast scenario for the resource specified in absolute quantity terms, specified in relative quantity terms, or generated based on a price template for the resource.

28. The method of claim 25, wherein the receiving of inputs specifying the forecast scenario comprise receiving availability attribute inputs corresponding to an availability forecast scenario for the resource specified in absolute quantity terms, specified in relative quantity terms, or generated based on an availability template for the resource.

29. A system comprising:
   a computer-readable medium storing computer-readable instructions; and
   a data processing unit coupled to the computer-readable medium, operable to execute the instructions, and based at least in part on the execution of the instructions operable to perform operations comprising providing a graphical user interface operable to perform operations comprising
      receiving inputs specifying one or more forward contracts in a sourcing portfolio for procuring a resource from one or more suppliers;
      receiving inputs specifying one or more aspects of a target sourcing strategy for procuring the resource;
      determining a procurement risk evaluation report comparing the sourcing portfolio and the target sourcing strategy; and
      presenting the procurement risk evaluation report.

30. The system of claim 29, wherein the graphical user interface is operable to receive inputs specifying quantities of the resource to be supplied by the sourcing portfolio in respective periods of a planning horizon.

31. The system of claim 30, wherein the graphical user interface is operable to receive quantity-specifying inputs for a price protection aspect of the target sourcing strategy.

32. The system of claim 31, wherein the price protection aspect of the target sourcing strategy corresponds to a specification of quantities of the resource covered by at least one of price cap terms and fixed price terms of the forward contracts in the sourcing portfolio.

33. The system of claim 30, wherein the graphical user interface is operable to receive quantity-specifying inputs for a quantity protection aspect of the target sourcing strategy.

34. The system of claim 33, wherein the quantity protection aspect of the target sourcing strategy corresponds to a specification of quantities of the resource covered by at least one of quantity floor terms and quantity cap terms of the forward contracts in the sourcing portfolio.

35. The system of claim 30, wherein the input quantities of the resource are specified as absolute quantities values.

36. The system of claim 30, wherein the input quantities of the resource are specified relative to a demand forecast scenario for the resource.

37. The system of claim 29, wherein the graphical user interface is operable to display a plot of quantities of the resource provided under terms of the forward contracts in the sourcing portfolio and a plot of quantities of the resource specified by a corresponding aspect of the target sourcing strategy over a planning horizon.

38. The system of claim 29, wherein the graphical user interface is operable to display a plot of a demand profile for the resource and a plot of quantities of the resource provided under terms of the forward contracts in the sourcing portfolio over a planning horizon.

39. A computer-readable medium comprising computer-readable instructions for causing a computer to perform operations comprising:
   receiving inputs specifying one or more forward contracts in a sourcing portfolio for procuring a resource from one or more suppliers;
   receiving inputs specifying one or more aspects of a target sourcing strategy for procuring the resource;
   determining a procurement risk evaluation report comparing the sourcing portfolio and the target sourcing strategy; and
   presenting the procurement risk evaluation report.

40. The computer-readable medium of claim 39, wherein the computer-readable instructions cause the computer to receive inputs specifying quantities of the resource to be supplied by the sourcing portfolio in respective periods of a planning horizon.

41. The computer-readable medium of claim 40, wherein the computer-readable instructions cause the computer to receive quantity-specifying inputs for a price protection aspect of the target sourcing strategy.

42. The computer-readable medium of claim 41, wherein the price protection aspect of the target sourcing strategy corresponds to a specification of quantities of the resource covered by at least one of price cap terms and fixed price terms of the forward contracts in the sourcing portfolio.

43. The computer-readable medium of claim 40, wherein the computer-readable instructions cause the computer to receive quantity-specifying inputs for a quantity protection aspect of the target sourcing strategy.

44. The computer-readable medium of claim 43, wherein the quantity protection aspect of the target sourcing strategy corresponds to a specification of quantities of the resource covered by at least one of quantity floor terms and quantity cap terms of the forward contracts in the sourcing portfolio.

45. The computer-readable medium of claim 40, wherein the input quantities of the resource are specified as absolute quantities values.

46. The computer-readable medium of claim 40, wherein the input quantities of the resource are specified relative to a demand forecast scenario for the resource.

47. The computer-readable medium of claim 39, wherein the computer-readable instructions cause the computer to display a plot of quantities of the resource provided under terms of the forward contracts in the sourcing portfolio and a plot of quantities of the resource specified by a corresponding aspect of the target sourcing strategy over a planning horizon.

48. The computer-readable medium of claim 39, wherein the computer-readable instructions cause the computer to display a plot of a demand profile for the resource and a plot of quantities of the resource provided under terms of the forward contracts in the sourcing portfolio over a planning horizon.

* * * * *